US012695403B2

(12) United States Patent
Huang et al.

(10) Patent No.: US 12,695,403 B2
(45) Date of Patent: Jul. 28, 2026

(54) BIDIRECTIONAL FREEWHEELING CIRCUIT FOR DIRECT CURRENT MOTOR

(71) Applicant: ANRONX TECHNOLOGY (BEIJING) CO., LTD, Beijing (CN)

(72) Inventors: Bo Huang, Beijing (CN); Jia Wang, Beijing (CN); Zeen Zhu, Beijing (CN); Chuan Zhang, Beijing (CN); Hui Wang, Beijing (CN); Yun Li, Beijing (CN); Bin Huang, Beijing (CN)

(73) Assignee: ANRONX TECHNOLOGY (BEIJING) CO., LTD, Beijing (CN)

( * ) Notice: Subject to any disclaimer, the term of this patent is extended or adjusted under 35 U.S.C. 154(b) by 697 days.

(21) Appl. No.: 18/265,259

(22) PCT Filed: Dec. 29, 2020

(86) PCT No.: PCT/CN2020/140753
§ 371 (c)(1),
(2) Date: Jun. 5, 2023

(87) PCT Pub. No.: WO2022/134152
PCT Pub. Date: Jun. 30, 2022

(65) Prior Publication Data
US 2026/0155767 A1       Jun. 4, 2026

(30) Foreign Application Priority Data
Dec. 24, 2020    (CN) .......................... 202011555456.6

(51) Int. Cl.
*H02J 1/12*           (2026.01)
*H02P 23/00*          (2016.01)

(52) U.S. Cl.
CPC .................................... *H02P 23/00* (2013.01)

(58) Field of Classification Search
CPC .......... H02J 1/12; H02M 1/0085; H02P 23/00
See application file for complete search history.

(56) References Cited

U.S. PATENT DOCUMENTS

2015/0085550 A1*    3/2015   Mueller .............. H02M 1/0085
                                                    363/132
2018/0254732 A1*    9/2018   Smolenaers .............. H02J 1/12

FOREIGN PATENT DOCUMENTS

CN          201590794          9/2010
CN          103780195          5/2014
(Continued)

OTHER PUBLICATIONS

"International Search Report (Form PCT/ISA/210) of PCT/CN2020/140753," mailed on Sep. 9, 2021, with English translation thereof, pp. 1-4.

(Continued)

*Primary Examiner* — Cortez M Cook
(74) *Attorney, Agent, or Firm* — JCIPRNET

(57)                ABSTRACT

Disclosed in the present disclosure is a bidirectional freewheeling circuit for a direct current motor. Two unidirectional freewheeling circuits are connected in parallel between a power supply and the direct current motor, the two unidirectional freewheeling circuits are a unidirectional freewheeling circuit I and a unidirectional freewheeling circuit II in sequence, and the unidirectional freewheeling circuit includes a diode and an equivalent switch connected in series to the diode. Conduction directions of the diodes in the two the unidirectional freewheeling circuits are opposite, when a voltage applied to both ends of the motor satisfies Ua>Ub, the equivalent switch I is turned on, the equivalent switch II is turned off, and when the voltage applied to both ends of the direct current motor satisfies Ua<Ub, the equivalent switch II is turned on, and the equivalent switch I is turned off.

6 Claims, 4 Drawing Sheets

(56)             References Cited

FOREIGN PATENT DOCUMENTS

| CN | 104638994 | 5/2015 |
| EP | 3229365 | 10/2017 |

OTHER PUBLICATIONS

"Written Opinion of the International Searching Authority (Form PCT/ISA/237) of PCT/CN2020/140753," mailed on Sep. 9, 2021, pp. 1-3.

* cited by examiner

BIDIRECTIONAL FREEWHEELING CIRCUIT FOR DIRECT CURRENT MOTOR

CROSS-REFERENCE TO RELATED APPLICATION

This application is a 371 of international application of PCT application serial no. PCT/CN2020/140753, filed on Dec. 29, 2020, which claims the priority benefit of China application no. 202011555456.6, filed on Dec. 24, 2020. The entirety of each of the above mentioned patent applications is hereby incorporated by reference herein and made a part of this specification.

BACKGROUND

Technical Field

The present disclosure relates to a bidirectional freewheeling circuit for a direct current motor.

Description of Related Art

In the design of a direct current motor control circuit, the absorption and freewheeling problems of stored energy of the motor at the moment of power failure need to be considered. Usually, diodes are connected in parallel at both ends of the motor by using the unidirectional performance of the diodes, and such part of stored energy is absorbed at the moment of power failure so as to reduce sparks and electromagnetic interference generated by the motor at the moment of power failure.

In application in which the direct current motor needs to be controlled to rotate in two directions, namely clockwise and anti-clockwise directions, a voltage applied to both ends of the motor may be a positive voltage, or may be a negative voltage, and the solution of simply connecting the diodes at both ends of the motor in parallel is obviously not feasible.

SUMMARY

Objective of disclosure: in order to solve the problem that when the freewheeling problem of a motor at the moment of power failure is solved by connecting diodes in parallel in the prior art, the motor only rotates in one direction (i.e. only rotating clockwise or anti-clockwise), such that flexibility is poor, the present disclosure provides a bidirectional freewheeling circuit for a direct current motor. According to the bidirectional freewheeling circuit, the freewheeling problem of the motor at the moment of power failure may be solved by using connecting two ways of unidirectional freewheeling circuits in parallel, and bidirectional rotation control over the direct current motor may also be achieved.

Technical solutions: according to the bidirectional freewheeling circuit for a direct current motor mentioned in the present disclosure, two unidirectional freewheeling circuits are connected in parallel between a power supply and the direct current motor, the two unidirectional freewheeling circuits are a unidirectional freewheeling circuit I and a unidirectional freewheeling circuit II in sequence, and the unidirectional freewheeling circuit includes a diode and an equivalent switch connected in series to the diode. Conduction directions of the diodes in the two unidirectional freewheeling loop are opposite, when a voltage applied to both ends of the motor satisfies Ua>Ub, the equivalent switch I is turned on, the equivalent switch II is turned off, and when the voltage applied to both ends of the direct current motor satisfies Ua<Ub, the equivalent switch II is turned on, and the equivalent switch I is turned off.

The equivalent switch includes a capacitor and at least one optical switch connected in parallel to the capacitor, and a Schottky diode is arranged on a charging loop of the capacitor and the power supply. The power supply charges the capacitor by means of the Schottky diode when the power supply is powered on, the capacitor is connected in parallel to a voltage-regulator diode (a capacitor charging voltage is controlled by a voltage-regulator diode in parallel), and multiple paths of optical switches are in an on state. When the power supply is powered off, the capacitor discharges to the multiple paths of optical switches for supply power, the multiple paths of optical switches are still in the on state, and the direct current motor forms a freewheeling loop by means of the diodes and the optical switches.

The unidirectional freewheeling circuit I includes a unidirectional capacitor charging loop I, a unidirectional capacitor discharge loop I and a unidirectional freewheeling loop I, where the unidirectional capacitor charging loop I includes a power supply, a resistor R1, a Schottky diode D7 and a capacitor C2, and in the unidirectional capacitor charging loop I, the capacitor C2 is connected in parallel to voltage-regulator diodes D13 and D14. The unidirectional capacitor discharge loop I includes an optical switch U1 discharge loop, and an optical switch U6 discharge loop, the optical switch U1 discharge loop includes a capacitor C2, a resistor R2 and an optical switch U1, and the optical switch U6 discharge loop includes a capacitor C2, a resistor R7 and an optical switch U6. The unidirectional freewheeling loop I includes an optical switch U1 freewheeling loop and an optical switch U6 freewheeling loop, the optical switch U1 freewheeling loop includes a direct current motor, a diode D15, a diode D16 and an optical switch U1, and the optical switch U6 freewheeling loop includes a direct current motor, a diode D15, a diode D16 and an optical switch U6.

The unidirectional freewheeling circuit II includes a unidirectional capacitor charging loop II, a unidirectional capacitor discharge loop II, and a unidirectional freewheeling loop II, where the unidirectional capacitor charging loop II includes a power supply, a resistor R10, a Schottky diode D12 and a capacitor C1, and in the unidirectional capacitor charging loop II, the capacitor C1 is connected in parallel to voltage-regulator diodes D4 and D5. The unidirectional capacitor discharge loop II includes an optical switch U2 discharge loop and an optical switch U8 discharge loop, the optical switch U2 discharge loop includes a capacitor C1, a resistor R4 and an optical switch U2, and the optical switch U8 discharge loop includes a capacitor C1, a resistor R9 and an optical switch U8. The unidirectional freewheeling loop II includes an optical switch U2 freewheeling loop and an optical switch U8 freewheeling loop, the optical switch U2 freewheeling loop includes a direct current motor, a diode D1, a diode D2 and an optical switch U2, and the optical switch U6 freewheeling loop includes a direct current motor, a diode D1, a diode D2 and an optical switch U8.

When the power supply is powered off, stored energy on the capacitor C2 is higher than a threshold voltage of a control terminal of the optical switch U1, and the stored energy on the capacitor C2 is also higher than a threshold voltage of a control terminal of the optical switch U6; or stored energy on the capacitor C1 is higher than a threshold voltage of a control terminal of the optical switch U2, and the stored energy on the capacitor C1 is also higher than a threshold voltage of a control terminal of the optical switch U8.

The working principle of the bidirectional freewheeling circuit for a direct current motor mentioned in the present disclosure is as follows:

The direct current motor is controlled to rotate in two directions, namely rotating clockwise and anti-clockwise, and the control voltage applied to both ends of the direct current motor M have three conditions, namely A, B, and C:

State A: corresponding (Ua−Ub)>0, the direct current motor M is controlled to rotate clockwise, the equivalent switch II of the unidirectional freewheeling circuit II is an open circuit, the unidirectional freewheeling circuit I acts at the moment of power failure of the power supply, and stored energy of the motor is absorbed.

State B: in a power-off condition, corresponding (Ua−Ub) =0, the direct current motor M is controlled to stop rotating.

State C: corresponding (Ua−Ub)<0, the direct current motor M is controlled to rotate anti-clockwise, the equivalent switch I of the unidirectional freewheeling circuit I is an open circuit, and the unidirectional freewheeling circuit II acts at the moment of power failure of the power supply, and stored energy of the motor is absorbed.

Beneficial effects: according to the bidirectional freewheeling circuit for the direct current motor of the present disclosure, bidirectional control over the direct current motor may also be achieved while freewheeling and absorption of the stored energy of the motor are achieved at the moment of power failure of the direct current motor, moreover, each unidirectional freewheeling circuit contains two paths of optical switches, and when one path of optical switch fails, a stable freewheeling loop may be formed by means of the other optical switch so as to ensure stable operation of the circuit.

DESCRIPTION OF THE EMBODIMENTS

Figure 1:
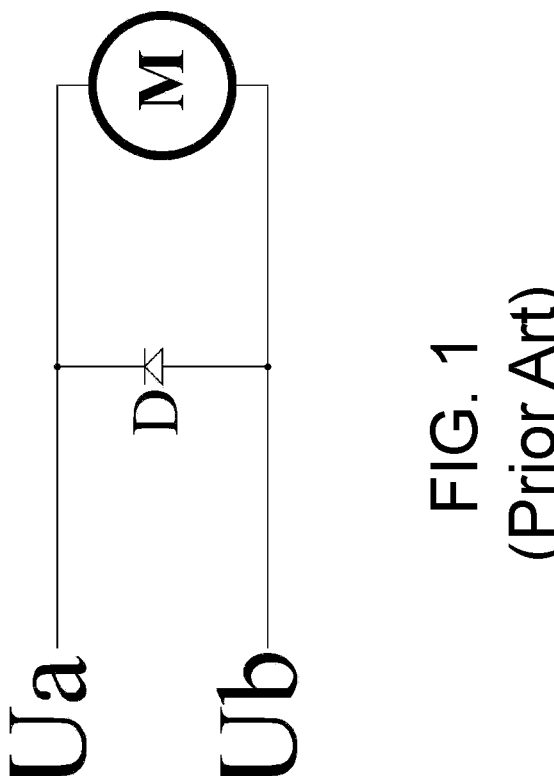
FIG. 1 is a schematic circuit diagram in which diodes are connected at both ends of a motor in parallel in the prior art.
Figure 2:
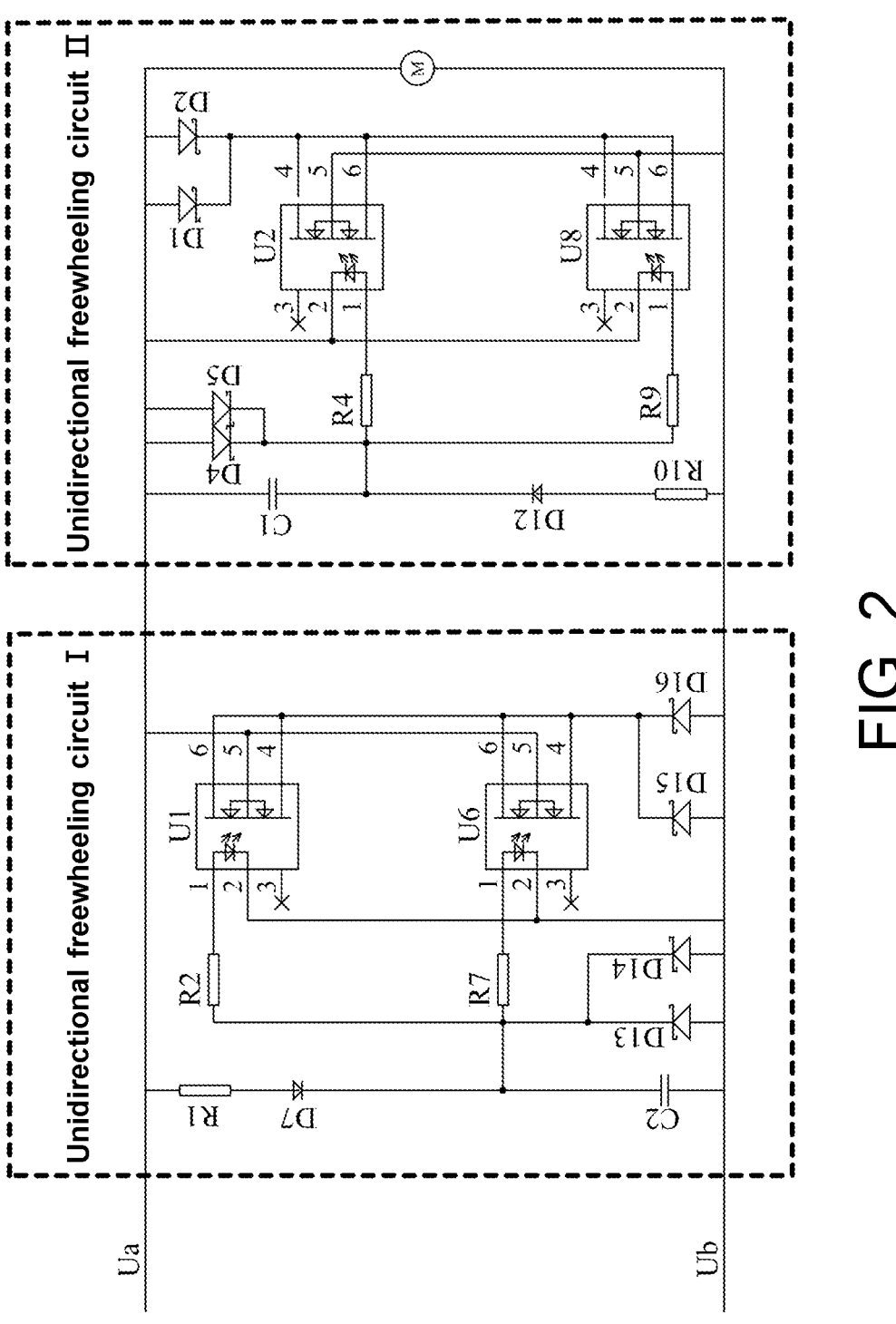
FIG. 2 is a schematic circuit diagram of a bidirectional freewheeling circuit for a direct current motor of the present disclosure.
Figure 3:
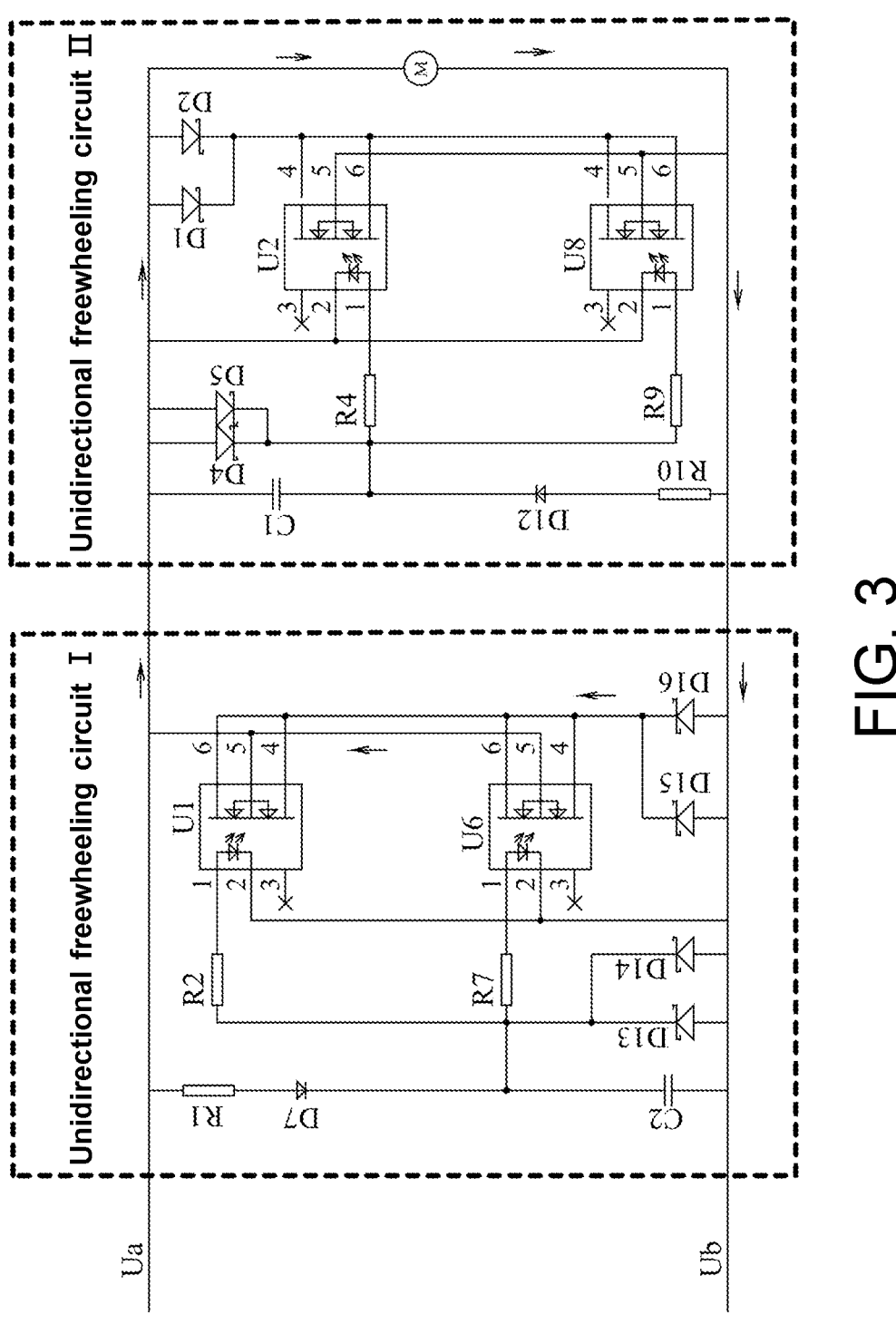
FIG. 3 is a schematic diagram for freewheeling and energy absorption of a direct current motor of the present disclosure from clockwise rotation to stopping.
Figure 4:
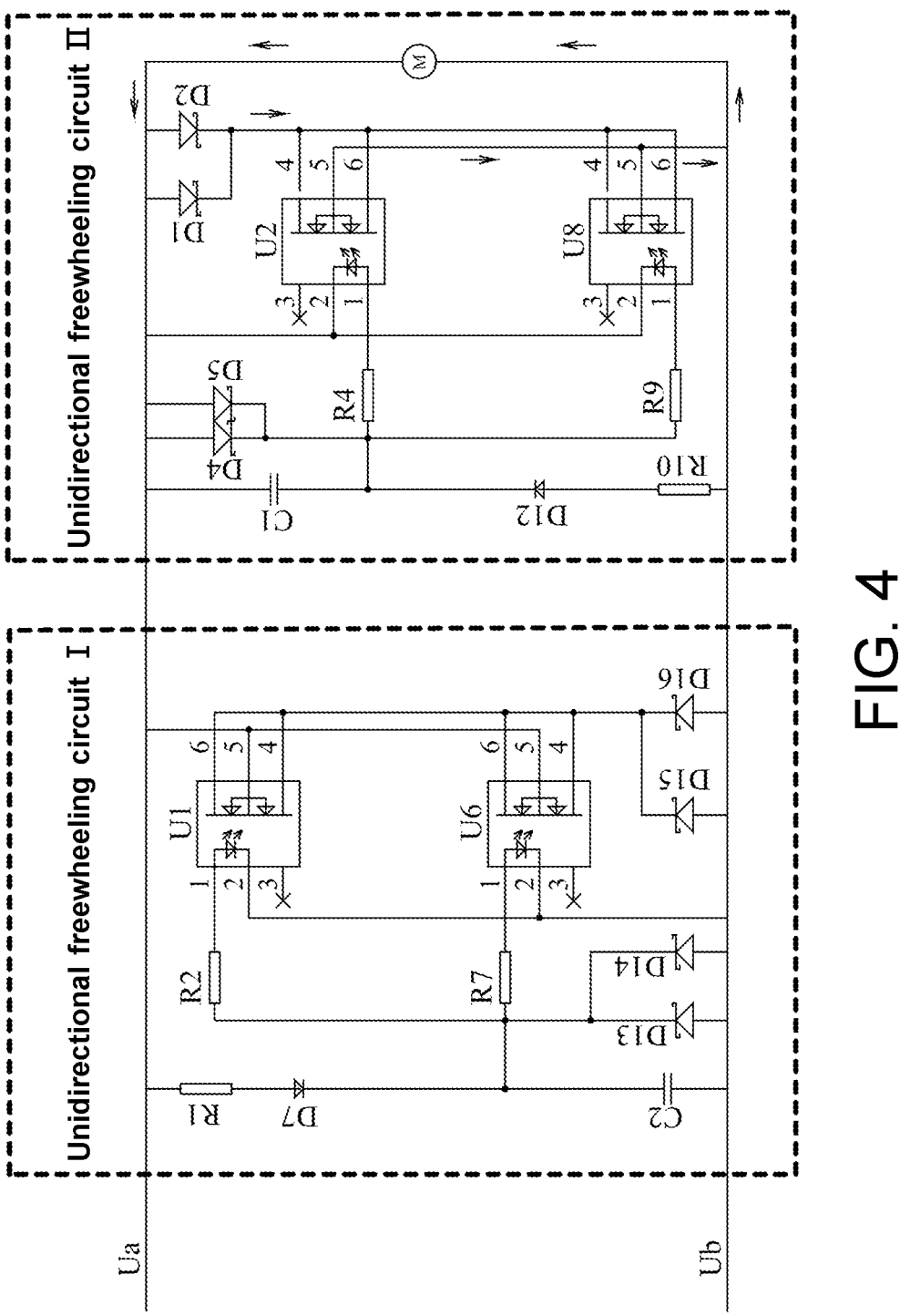
FIG. 4 is a schematic diagram for freewheeling and energy absorption of a direct current motor of the present disclosure from anti-clockwise rotation to stopping.

As shown in FIGS. 2-4, the bidirectional freewheeling circuit for the direct current motor of the present disclosure includes the direct current motor M, a unidirectional freewheeling circuit I is composed of a resistor R1, a resistor R2, a resistor R7, a diode D7, a voltage-regulator diode D13, a voltage-regulator diode D14, a diode D15, a diode D16, a capacitor C2, an optical switch U1, and an optical switch U6, and a unidirectional freewheeling circuit II is composed of a resistor R3, a resistor R10, a resistor R9, a diode D1, a diode D2, a voltage-regulator diode D4, a voltage-regulator diode D5, a diode D12, a capacitor C1, an optical switch U2 and an optical switch U8.

The unidirectional freewheeling circuit I includes:

the resistor R1, the diode D7, the capacitor C2, the voltage-regulator diode D13 and the voltage-regulator diode D14 form a unidirectional charging loop I for the capacitor C2, where the voltage-regulator diode D13 and the voltage-regulator diode D14 protect and limit a charging voltage;

the capacitor C2, the resistor R2, and the optical switch U1 form a discharge loop I to maintain the optical switch U1 in an on state within time T;

the capacitor C2, the resistor R7, and the optical switch U6 form a backup discharge loop II of the discharge loop I so as to maintain the optical switch U6 in an on state within the time T;

the optical switch U1, the diode D15 and the diode D16 form a freewheeling loop I for the direct current motor M to absorb energy released by the direct current motor M at the moment when a power supply stops; and the optical switch U6, the diode D15 and the diode D16 form a backup freewheeling loop II of the freewheeling loop I for the direct current motor M so as to absorb the energy released by the direct current motor M at the moment when the power supply stops.

The unidirectional freewheeling circuit II includes:

the resistor R10, the diode D12, the capacitor C1, the voltage-regulator diode D4 and the voltage-regulator diode D5 form a unidirectional charging loop II for the capacitor C1, where the voltage-regulator diode D4 and the voltage-regulator diode D5 protect and limit a charging voltage;

the capacitor C1, the resistor R4 and the optical switch U2 form a unidirectional discharge loop I so as to maintain the optical switch U2 in an on state within time T;

the capacitor C1, the resistor R9 and the optical switch U8 form a backup discharge loop II of the unidirectional discharge loop I so as to maintain the optical switch U8 in an on state within time T;

the optical switch U2, the diode D1 and the diode D2 form a unidirectional freewheeling loop I for the direct current motor M to absorb energy released by the direct current motor M at the moment when the power supply stops; and the optical switch U8, the diode D1 and the diode D2 form a backup unidirectional freewheeling loop II of the unidirectional freewheeling loop I for the direct current motor M so as to absorb the energy released by the direct current motor M at the moment when the power supply stops.

The voltage applied to both ends of the direct current motor M have three states, namely A, B, and C: state A is (Ua−Ub)>0, and a steady-state current flowing through M is +I; state B is (Ua−Ub)=0, and in this case, the circuit is in an open-circuit state; and state C is (Ua−Ub)<0, and the steady-state current flowing through M is −I.

When the voltage applied to both ends of the direct current motor M is in the state A, the direct current motor M is controlled to rotate clockwise, the steady-state current flowing through M is +I, the unidirectional freewheeling circuit I acts, the voltage (Ua−Ub)>0, the charging loop formed by the resistor R1, the diode D7, the capacitor C2, the voltage-regulator diode D13 and the voltage-regulator diode D14 charges the capacitor C2, the voltage-regulator diode D13 and the voltage-regulator diode D14 (playing a voltage division role) prevent the Ua from being too large to damage the optical switch U1. By means of the resistor R1, the diode D7, and the resistor R2, the optical switch U1 is turned on. Moreover, the optical switch U6 is turned on by means of R1, the diode D7 and the resistor R7, and in the unidirectional freewheeling circuit II, because of the unidirectional performance of the diode D12, the optical switch U2 and the optical switch U8 are in an off state.

When the voltage applied to both ends of the direct current motor M is converted from the state A to the state B, the stored energy on the capacitor C2 in the unidirectional freewheeling circuit I is turned on within the time T by means of communication between the resistor R2 and the optical switch U1 (being turned on within this time T), and is also turned on within the same time T by means of communication between the resistor R7 and U6, and the stored energy of the direct current motor M forms a freewheeling loop by means of the optical switch U1, the optical switch U6, the diode D15, and the diode D16.

When the voltage applied to both ends of the direct current motor M is in the state C, the direct current motor M is controlled to rotate anti-clockwise, the steady-state current flowing through the direct current motor M is −I, the unidirectional freewheeling circuit II acts, the voltage (Ua−Ub)<0, and the capacitor C1 is charged by the charging loop formed by the resistor R10, the diode D12, the capacitor C1, the voltage-regulator diode D4, and the voltage-regulator diode D5. By means of the resistor R10, the diode D12, and the resistor R9, the optical switch U8 is turned on. Moreover, the optical switch U2 is turned on by means of R10, the diode D12 and the resistor R4, and in the unidirectional freewheeling circuit I, because of the unidirectional performance of the diode D7, the optical switch U1 and the optical switch U6 are in an off state.

When the voltage applied to both ends of the direct current motor M is converted from the state C to the state B, the stored energy on the capacitor C1 in the unidirectional freewheeling circuit II is turned on within the time T by means of communication between the resistor R4 and the optical switch U2, and is also turned on within the same time T by means of communication between the resistor R9 and U8, and the stored energy of the direct current motor M forms a freewheeling loop by means of the optical switch U2, the optical switch U8, the diode D1 and the diode D2.

An energy storage formula of the capacitor is W=½ CU² (U is the capacitor charging voltage value), and an energy storage formula of an inductor is W=½ LI².

For a calculation formula of charging and discharging time of the capacitor, it is assumed that the power supply Vu charges the capacitor C by means of the resistor R, V0 is an initial voltage value on the capacitor, Vu is a voltage value after the capacitor is fully charged, Vt is a voltage value on the capacitor at any moment t, and the following calculation formula may be obtained:

$$Vt = V0 + (Vu - V0) * [1 - \exp(-t/RC)]$$

If the initial voltage on the capacitor is 0, the formula may be simplified to be:

$$Vt = Vu * [1 - \exp(-t/RC)] \qquad \text{(charging formula)}$$

As may be seen from the above formula, because an index value may only be infinitely close to 0, but never equal to 0, if the capacity of the capacitor needs to be fully filled, and infinite time is required.

When $t = RC$, $Vt = 0.63Vu$;

when $t = 2RC$, $Vt = 0.86Vu$;

-continued when $t = 3RC$, $Vt = 0.95Vu$;

when $t = 4RC$, $Vt = 0.98Vu$;

when $t = 5RC$, $Vt = 0.99Vu$;

it may be seen that after 3-5RC, the charging process ends basically.

After the capacitor is fully charged, the power supply Vu is short-circuited, the capacitor C will discharge through R, and at any moment t, the voltage on the capacitor is:

$$Vt = Vu * \exp(-t/RC) \qquad \text{(discharge formula)}$$

For calculation of the time constant RC of the circuit, the circuit after the power supply is removed is simplified into an RC discharge loop in which the equivalent resistor R and the equivalent capacitor C are connected in series, and the product of the equivalent resistor R and the equivalent capacitor C is the time constant of the circuit. When the unit of the resistor is "ohm" and the unit of the capacitor is "farad", the multiplied time constant unit is "second".

When the capacitor is charged, after a time constant RC, the voltage on the capacitor is equal to 0.63 times the voltage of the charging power supply, and when the capacitor discharges, after a time constant RC, the voltage on the capacitor drops to 0.37 times the voltage of the power supply.

Here, the optical switches (U1, U6, U2 and U8) select G3VM-21HR of a company of OMRON. In the case of conduction, a threshold voltage is VON, and an internal resistance value is $R_{ON1}$. The freewheeling diodes (D4, D5, D15 and D16) select PMEG3050EP of a company of NXP. In the case of conduction, an internal resistance value is $R_{ON2}$. An internal resistance value of the direct current motor itself is $R_{ON3}$. It is assumed that a rated current of the direct current motor is I, an inductance value is L, It is a current value on the inductor at any moment t, and we may approximate the energy stored on the direct current motor to W=½LI². When the direct current motor is switched from a rotational state to a stopped state, the energy stored on the direct current motor requires time t to be consumed on $R_{ON1}$, $R_{ON2}$, and $R_{ON3}$, and an inductance discharge formula is:

$$It = I * \exp[-t * (R_{ON1} + R_{ON2} + R_{ON3})/L]$$

A formula of the freewheeling time t may be derived as:

$$t = \ln(It/I) * L/(R_{ON1} + R_{ON2} + R_{ON3})$$

Then, according to the foregoing, the capacitor discharge formula is:

$$Vt = Vu * \exp(-t/RC)$$

Here, Vu is a voltage value after the capacitor is fully charged, Vt is a voltage value on the capacitor at any moment t, R is a resistance value of a discharge loop, and C is a capacitance value of an energy storage capacitor.

Only when the Vt is greater than or equal to $V_{ON}$, the optical switch in the circuit may be stably turned on, such that a voltage limit value of the energy storage capacitor is $V_{ON}$, and we may obtain a capacitance value calculation formula of the energy storage capacitor of a key element by substituting the freewheeling time into the capacitor for discharge:

$$C = -t/R/\ln(V_{ON}/Vu) = -[\ln(It/I)*L/(R_{ON1} + R_{ON2} + R_{ON3})]/R/\ln(V_{ON}/Vu)$$

Therefore, when the voltage applied to both ends of the direct current motor M is converted from the state A to the state B, the stored energy on the capacitor C2 in the unidirectional freewheeling circuit I is higher than the threshold voltage of the control terminal of the optical switch U1, and the optical switch U1 is controlled to be turned on within the time T by means of the resistor R2, and in this case, the stored energy of the direct current motor M forms a freewheeling loop by means of the optical switch U1, the diode D15 and the diode D16. At the same moment, the stored energy on the capacitor C2 is also higher than the threshold voltage of the control terminal of the optical switch U6, the optical switch U6 is controlled to be turned on within the same time T by means of the resistor R7, and the stored energy of the direct current motor M also forms a freewheeling loop by means of the optical switch U6, the diode D15 and the diode D16. When one of the optical switch U1 and the optical switch U6 fails, a stable freewheeling loop may be formed by means of the other one of same may to ensure stable operation of the circuit.

When the voltage applied to both ends of the direct current motor M is converted from the state C to the state B, the stored energy on the capacitor C1 in the unidirectional freewheeling circuit II is higher than the threshold voltage of the control terminal of the optical switch U2, the optical switch U2 is controlled to be turned on within the time T by means of the resistor R4, and in this case, the stored energy of the direct current motor M forms a freewheeling loop by means of the optical switch U2, the diode D1 and the diode D2. At the same moment, the stored energy on the capacitor C1 is also higher than the threshold voltage of the control terminal of the optical switch U8, the optical switch U8 is controlled to be turned on within the same time T by means of the resistor R9, and the stored energy of the direct current motor M also forms a freewheeling loop by means of the optical switch U8, the diode D1 and the diode D2. When one of the optical switch U2 and the optical switch U8 fails, a stable freewheeling loop may be formed by means of the other one of same may to ensure stable operation of the circuit, that is, the time when the capacitor drops from the charging voltage value to the threshold voltage value of the optical switch is greater than or equal to the discharge time of the direct current motor.

According to the bidirectional freewheeling circuit for the direct current motor of the present disclosure, the unidirectional freewheeling circuit I adapts to the clockwise rotation condition of the motor, and the unidirectional freewheeling circuit II adapts to the anti-clockwise condition of the motor, thereby achieving fast bidirectional freewheeling and energy absorption at the moment of power failure of the direct current motor.

What is claimed is:

1. A bidirectional freewheeling circuit for a direct current motor, wherein two unidirectional freewheeling circuits are connected in parallel between a power supply and the direct current motor, the two unidirectional freewheeling circuits are a first unidirectional freewheeling circuit and a second unidirectional freewheeling circuit in sequence, each one of the first the unidirectional freewheeling circuit and the second unidirectional freewheeling circuit comprises a diode and an equivalent switch connected in series to the diode, conduction directions of the diodes in the two unidirectional freewheeling circuits are opposite, wherein when a voltage applied to both ends of the direct current motor satisfies Ua>Ub, the equivalent switch in the first unidirectional freewheeling circuit is turned on, the equivalent switch in the second unidirectional freewheeling circuit is turned off, and when the voltage applied to both ends of the direct current motor satisfies Ua<Ub, the equivalent switch in the second unidirectional freewheeling circuit is turned on, and the equivalent switch in the first unidirectional freewheeling circuit is turned off, wherein Ua is a first voltage signal applied to a first end of the direct current motor, and Ub is a second voltage signal applied to a second end of the direct current motor.

2. The bidirectional freewheeling circuit for a direct current motor according to claim 1, wherein the equivalent switch in each one of the two unidirectional freewheeling circuits comprises a capacitor and at least one optical switch connected in parallel to the capacitor, a Schottky diode is arranged on a charging loop of the capacitor and the power supply, wherein the power supply charges the capacitor by means of the Schottky diode when the power supply is powered on, the capacitor is connected in parallel to a voltage-regulator diode, and meanwhile, multiple paths of optical switches are in an on state, when the power supply is powered off, the capacitor discharges to the multiple paths of the optical switches for supplying power, the multiple paths of optical switches are still in the on state, and the direct current motor forms a freewheeling loop by means of the diodes and the optical switches.

3. The bidirectional freewheeling circuit for a direct current motor according to claim 1, wherein the first unidirectional freewheeling circuit comprises a first unidirectional capacitor charging loop, a first unidirectional capacitor discharge loop and a first unidirectional freewheeling loop, wherein the first unidirectional capacitor charging loop comprises the power supply, a first resistor, a seventh Schottky diode and a second capacitor, in the first unidirectional capacitor charging loop, the second capacitor is connected in parallel to a thirteenth voltage-regulator diode and a fourteenth voltage-regulator diode, the first unidirectional capacitor discharge loop comprises a discharge loop of a first optical switch a discharge loop of a sixth optical switch, the discharge loop of the first optical switch comprises the second capacitor, a resistor R2 and the first optical switch U1, the discharge loop of the sixth optical switch comprises the second capacitor, a seventh resistor and the sixth optical switch, the first unidirectional freewheeling loop comprises a freewheeling loop of the first optical switch and a freewheeling loop of the sixth optical switch, the freewheeling loop of the first optical switch comprises the direct current motor, a fifth diode, a sixteenth diode and the first optical switch, and the freewheeling loop of the sixth optical switch comprises direct current motor, the diode, the sixteenth diode D16 and the sixth optical switch.

4. The bidirectional freewheeling circuit for a direct current motor according to claim 1, wherein the second unidirectional freewheeling circuit comprises a second unidirectional capacitor charging loop, a second unidirectional capacitor discharge loop, and a second unidirectional freewheeling loop, wherein the second unidirectional capacitor charging loop comprises the power supply, a tenth resistor, a twelfth Schottky diode and a first capacitor, in the second unidirectional capacitor charging loop, the first capacitor is connected in parallel to a fourth voltage-regulator diode and a fifth voltage-regulator diode, the second unidirectional capacitor discharge loop comprises a discharge loop of a second optical switch and a discharge loop of an eighth optical switch, the discharge loop of the second optical switch comprises the capacitor, a fourth resistor and the second optical switch, the discharge loop of the eighth optical switch comprises the capacitor, a ninth resistor and the eighth optical switch, the second unidirectional freewheeling loop comprises a freewheeling loop of the second optical switch and a freewheeling loop of the eighth optical switch, the freewheeling loop of the second optical switch comprises the direct current motor, a first diode, a second diode and the second optical switch, and the freewheeling loop of the eighth optical switch comprises the direct current motor, the first diode D1, the second diode D2 and the eighth optical switch.

5. The bidirectional freewheeling circuit for a direct current motor according to claim 3, wherein when the power supply is powered off, stored energy on the second capacitor is higher than a threshold voltage of a control terminal of the first optical switch, and the stored energy on the second capacitor is also higher than a threshold voltage of a control terminal of the sixth optical switch.

6. The bidirectional freewheeling circuit for a direct current motor according to claim 4, wherein stored energy on the first capacitor is higher than a threshold voltage of a control terminal of the second optical switch, and the stored energy on the first capacitor is also higher than a threshold voltage of a control terminal of the eighth optical switch.

* * * * *